US012222258B2

(12) United States Patent
Zhou

(10) Patent No.: US 12,222,258 B2
(45) Date of Patent: Feb. 11, 2025

(54) TEST FIXTURE FOR ALIGNING CENTER OF LENS

(71) Applicant: TRIPLE WIN TECHNOLOGY(SHENZHEN) CO.LTD., Shenzhen (CN)

(72) Inventor: Wei Zhou, Shenzhen (CN)

(73) Assignee: TRIPLE WIN TECHNOLOGY(SHENZHEN) CO.LTD., Shenzhen (CN)

( * ) Notice: Subject to any disclaimer, the term of this patent is extended or adjusted under 35 U.S.C. 154(b) by 841 days.

(21) Appl. No.: 17/411,255

(22) Filed: Aug. 25, 2021

(65) Prior Publication Data

US 2021/0381924 A1 Dec. 9, 2021

Related U.S. Application Data

(62) Division of application No. 16/452,661, filed on Jun. 26, 2019, now Pat. No. 11,131,600.

(30) Foreign Application Priority Data

May 16, 2019 (CN) .......................... 201910407737.8

(51) Int. Cl.
    *G01M 11/02* (2006.01)
(52) U.S. Cl.
    CPC .... *G01M 11/0214* (2013.01); *G01M 11/0221* (2013.01)
(58) Field of Classification Search
    CPC . G01M 11/0214; G01M 11/0221; B25H 1/10; B25H 3/003; B27C 5/00; B27C 5/06
    See application file for complete search history.

(56) References Cited

U.S. PATENT DOCUMENTS

| 4,281,694 A | * | 8/1981 | Gorman | B23Q 9/00 |
| | | | | 83/745 |
| 5,224,716 A | * | 7/1993 | Saeda | B23Q 1/5406 |
| | | | | 409/222 |
| 11,131,600 B2 | * | 9/2021 | Zhou | G01M 11/0221 |
| 2001/0019398 A1 | * | 9/2001 | Agata | G02B 7/10 |
| | | | | 353/100 |
| 2009/0002825 A1 | * | 1/2009 | Morita | G03B 5/00 |
| | | | | 359/554 |
| 2015/0174715 A1 | * | 6/2015 | Kang | B23P 19/04 |
| | | | | 29/714 |

FOREIGN PATENT DOCUMENTS

CN 105973291 A 9/2016

* cited by examiner

*Primary Examiner* — Michael A Lyons
(74) *Attorney, Agent, or Firm* — ScienBiziP, P.C.

(57) ABSTRACT

A test fixture includes a base and an adjustable structure. The adjustable structure includes a limiting block, a locking block, and a fixing member. The limiting block is disposed on the base. The locking block is disposed on the base and abuts an edge of the limiting block to lock the limiting block in position. The fixing member is disposed on the limiting block to fix the limiting block on the base. When the locking block is moved from a first position to a second position, the locking block unlocks the limiting block, the fixing member is loosened, and the limiting block can rotate on the base. After the limiting block is rotated, the locking block is moved from the second position to the first position to lock the limiting block, and the fixing member is tightened to fix the limiting block on the base.

8 Claims, 4 Drawing Sheets

TEST FIXTURE FOR ALIGNING CENTER OF LENS

FIELD

The subject matter herein generally relates to test fixtures, and more particularly to a test fixture for aligning a center of a lens of a product.

BACKGROUND

Existing test fixtures include a housing portion having a shape similar to a shape of a product for testing. After the cover of the test fixture is covered, the product disposed in the fixture is positioned through the cover. However, loosening and tightening of a screw on the cover may not be well controlled to fine-tune a position of the product.

BRIEF DESCRIPTION OF THE DRAWINGS

Implementations of the present disclosure will now be described, by way of embodiments, with reference to the attached figures.

DETAILED DESCRIPTION

Figure 1:
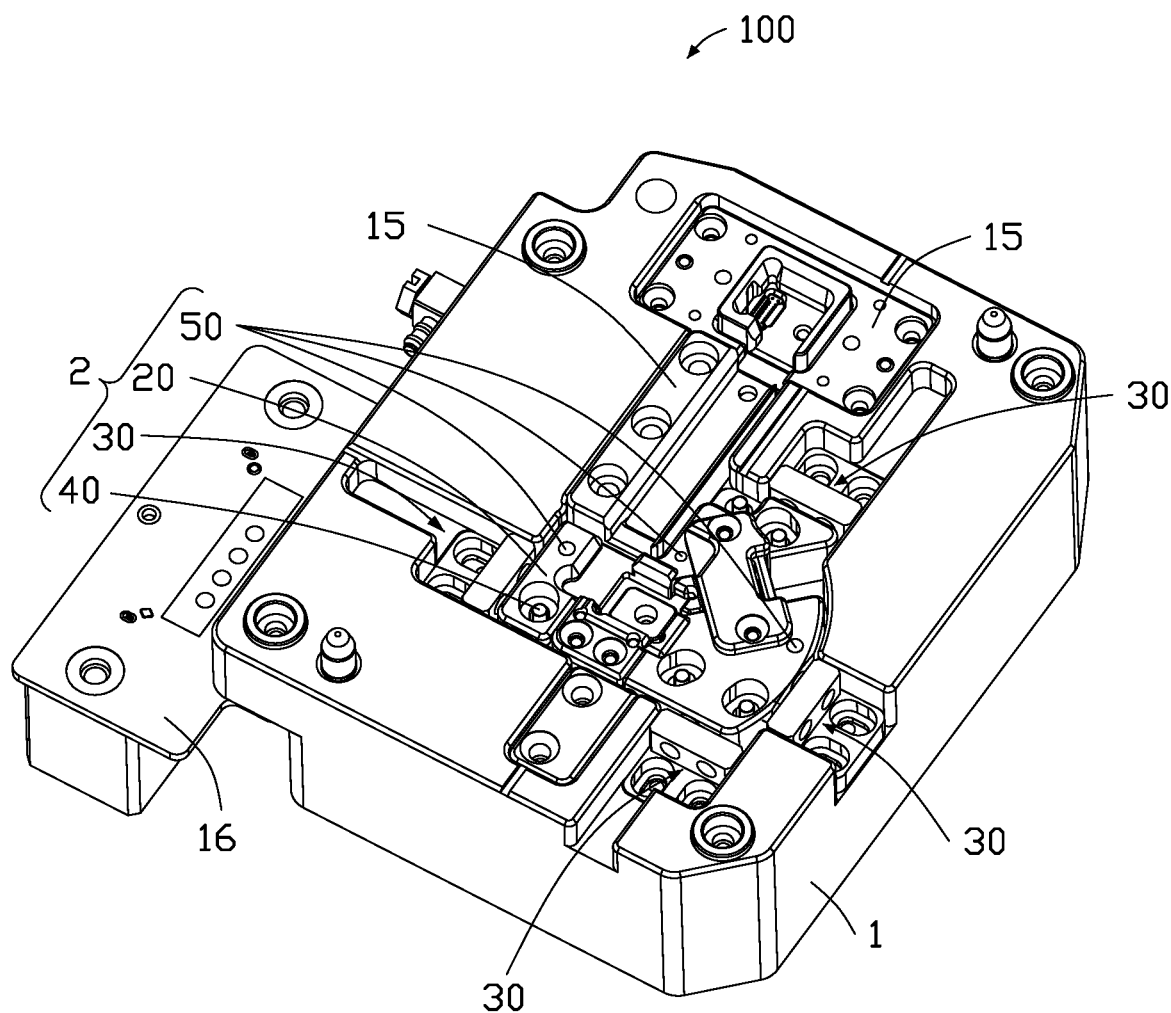
FIG. 1 is an isometric view of an embodiment of a test fixture.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

FIG. 1 shows an embodiment of a test fixture 100 for adjusting a position of a product, such as a lens of a mobile phone, and detecting a center of the lens. The test fixture 100 includes a cover plate (not shown) and a base 1 connected to the cover plate. The test fixture 100 further includes an adjustable structure 2 disposed on the base 1.

Figure 2:
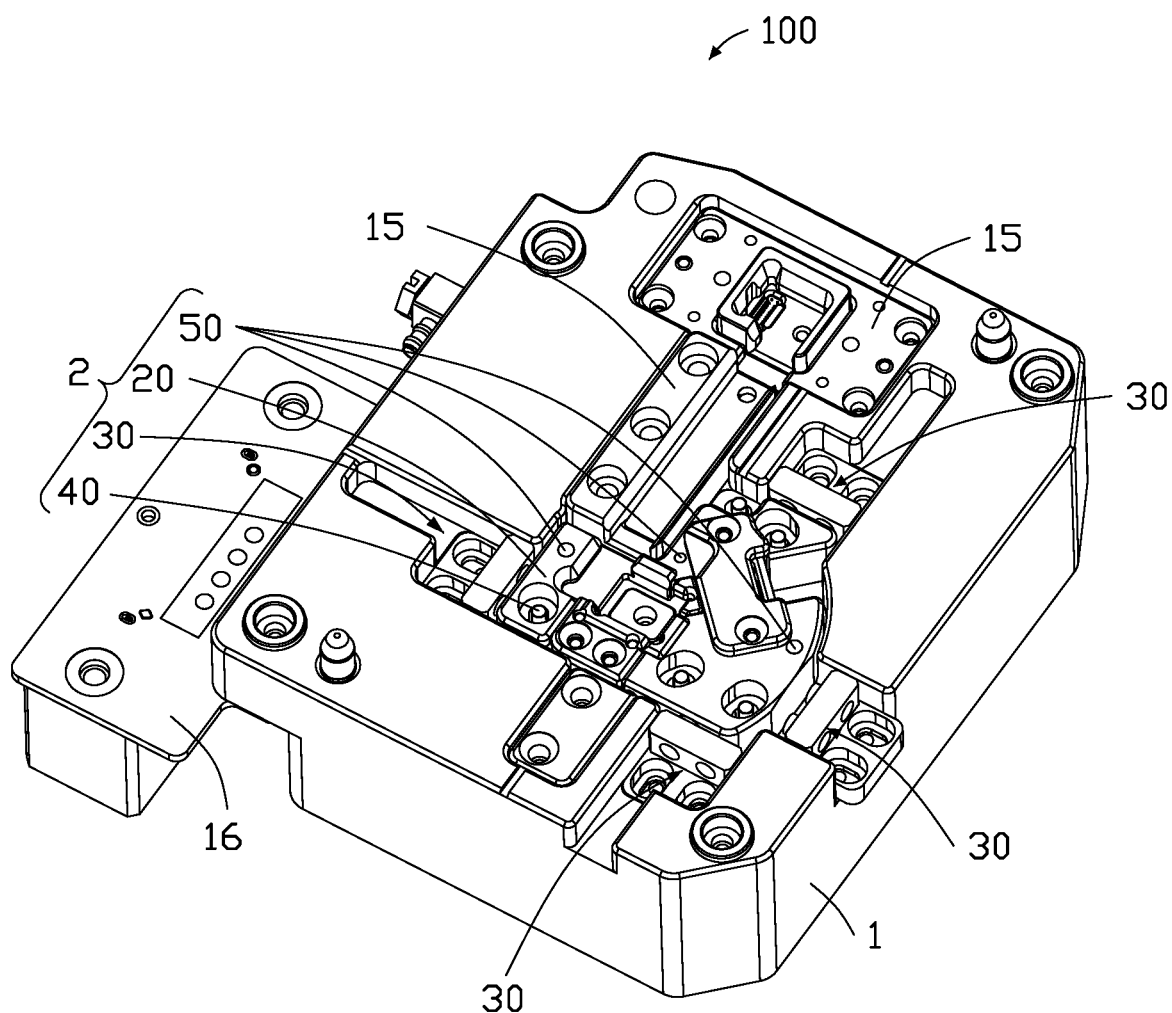
FIG. 2 is similar to FIG. 1, but showing a locking block removed from a limiting block.

Referring to FIGS. 1 and 2, the adjustable structure 2 includes a limiting block 20, at least one locking block 30, and at least one fixing member 40. The limiting block 20 is disposed on the base 1. The locking block 30 is disposed on the base 1 and abuts an edge of the limiting block 20 to lock the limiting block 20 in position. The fixing member 40 is disposed on the limiting block 20 to fix the limiting block 20 on the base 1.

When the locking block 30 is moved from a first position to a second position, the locking block 30 unlocks the limiting block 20. The fixing member 40 is loosened, so that the limiting block 20 can rotate on the base 1. After the limiting block 20 is rotated, the locking block 30 is moved from the second position to the first position to lock the limiting block 20, and the fixing member 40 is tightened to fix the limiting block 20 on the base 1.

It can be understood that in the first position, the locking block 30 abuts against the limiting block 20, and in the second position, the locking block 30 does not abut against the limiting block 20.

Figure 3:
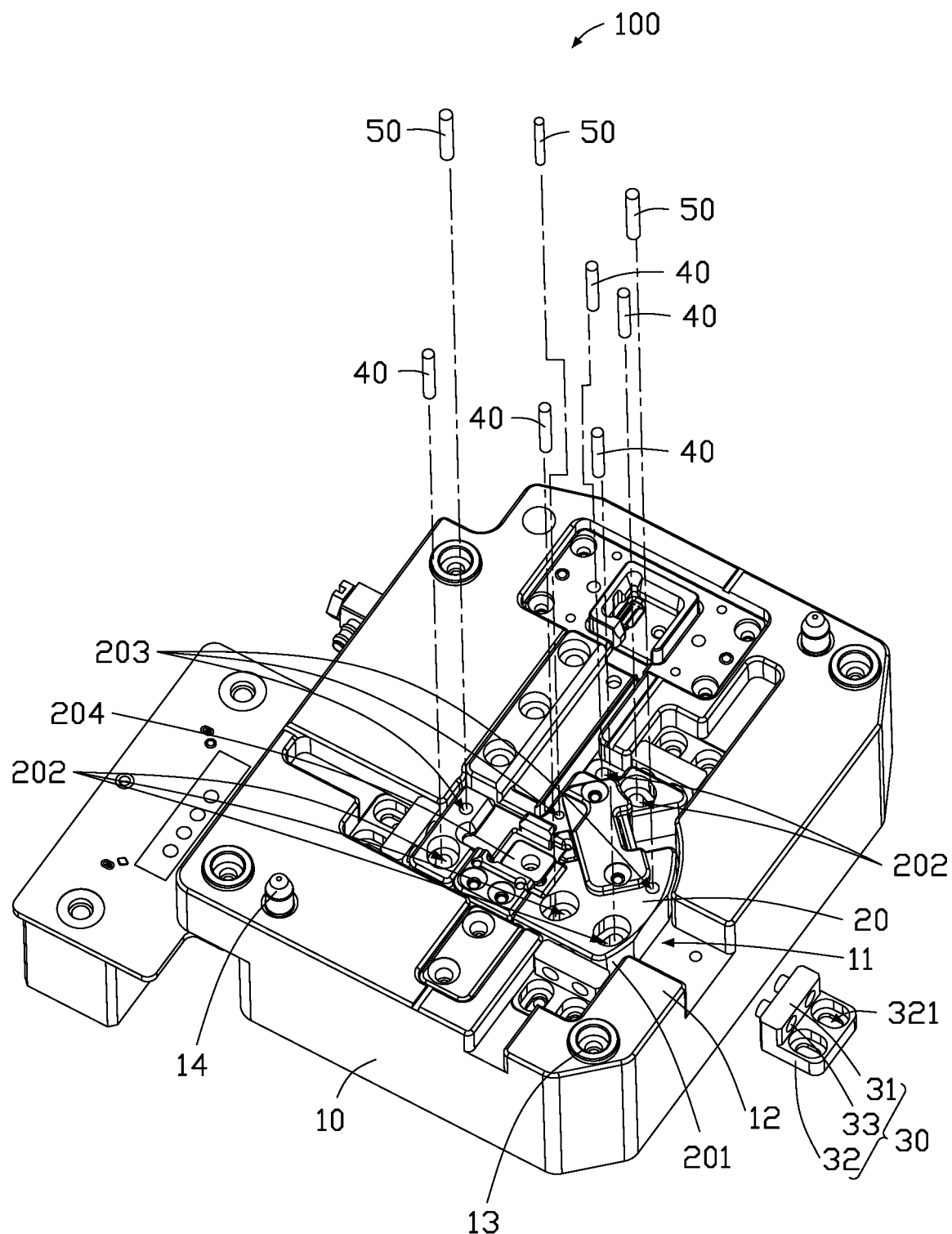
FIG. 3 is an exploded view of the test fixture.
Figure 4:
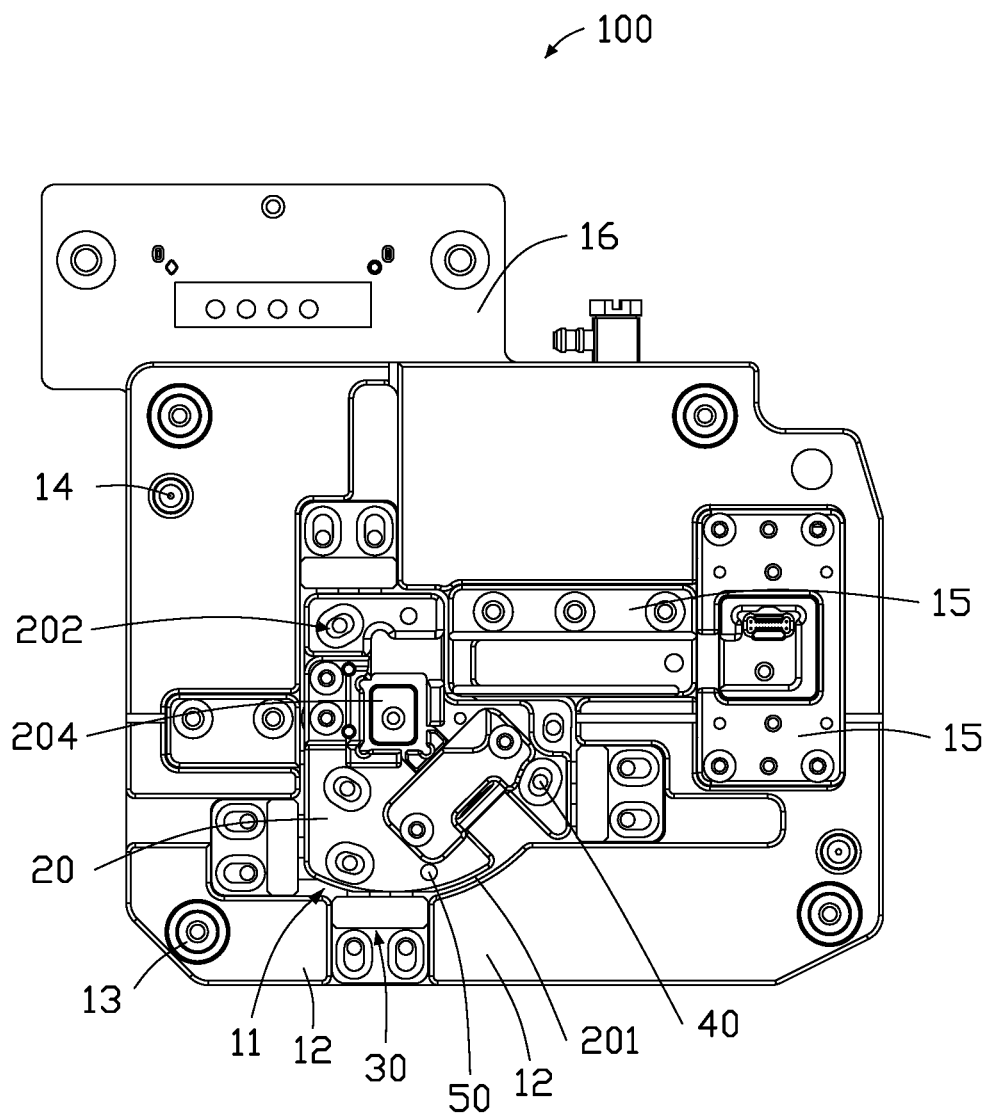
FIG. 4 is a top view of the test fixture.

Referring to FIG. 3 and FIG. 4, the base 1 is substantially rectangular in cross-section, and a plurality of limiting portions 12 are disposed around an edge of a top surface of the base 1. The plurality of limiting portions 12 cooperatively enclose a receiving cavity 11. The receiving cavity 11 receives the limiting block 20. An edge contour of the limiting portions 12 adjacent to the limiting block 20 match an edge contour of the limiting block 20. The limiting portions 12 limit a lateral movement of the locking block 30. The limiting portions 12 are fixed on the base 1. The base 1 defines a positioning slot 13 and includes a protruding post 14 protruding from the top surface of the base 1. When the cover is covered on the base 1, the protruding post 14 protrudes into the cover for positioning, and a positioning rod of the cover (not shown) is received in the positioning groove 13 to position the cover on the base 1. In one embodiment, the limiting portions 12 are integrally formed with the base 1. In other embodiments, a positioning manner of the cover and the base 1 may be changed.

Referring to FIG. 4, an upper edge and left and right edges of the limiting block 20 are substantially linear, and a lower edge of the limiting block 20 forms a curved sidewall 201. The limiting portion 12 adjacent to the curved sidewall 201 forms a curved contour facing the curved sidewall 201.

The limiting block 20 defines at least one first through hole 202 and includes a fixing portion 204. In one embodiment, the limiting block 20 defines five first through holes 202, and an opening of the first through holes 202 are defined having a predetermined length. Three first through holes 202 are defined on a first side of the limiting block 20, and two first through holes 202 are defined on a second side of the limiting block 20 opposite the first side. A quantity of the fixing member 40 is equal to a quantity of the first through hole 202. The fixing members 40 are disposed in the first through holes 202 and are fixed on the base 1. When the limiting block 20 is rotated on the base 1, a position of the fixing member 40 in the first through hole 202 changes. In one embodiment, the fixing member 40 is an adjusting screw. The fixing portion 204 is disposed substantially at a central position of the limiting block 20, and a vacuum suction tube (not shown) is disposed at a bottom side of the fixing portion 204 for adsorbing the product to a top side of the fixing portion 204 by vacuum adsorption. The limiting block 20 is adjusted to adjust the center of the lens of the product placed on the limiting block 20.

In one embodiment, the limiting block 20 further defines three third through holes 203. The third through holes 203 are disposed corresponding to the three first through holes 202 disposed on the first side of the limiting block 20. The test fixture 100 further includes positioning posts 50. When the limiting block 20 is disposed on the base 1, the positioning posts 50 are received in the third through holes 203 to fix the limiting block 20 in an initial position on the base 1. To adjust the limiting block 20, the positioning posts 50 are removed from the third through holes 203 to unlock the limiting block 20, so that the limiting block 20 can be adjusted.

It can be understood that, in other embodiments, quantities and positions of the first through holes 202, the third through holes 203, and the positioning posts 50 can be set according to specific needs of the test fixture 100.

Referring to FIG. 3 and FIG. 4, the test fixture 100 includes four locking blocks 30. The four locking blocks 30 are respectively disposed at four ends of the limiting block 20. Sides of each locking block 30 are substantially in contact with the corresponding limiting portion 12, and the locking block 30 is movable toward and away from the limiting block 20 to lock or unlock the limiting block 20.

The locking block 30 includes a first locking portion 31 and a second locking portion 32 coupled to the first locking portion 31. The first locking portion 31 and the second locking portion 32 are substantially perpendicular to each other. The first locking portion 31 includes fasteners 33 on a side of the first locking portion 31 facing the limiting block 20. The fasteners 33 abut against the limiting block 20 when the locking block 30 locks the limiting block 20. When the limiting block 20 is to be adjusted, the fasteners 33 are moved away from the limiting block 20. The first locking portion 31 includes two fasteners 33. In one embodiment, the fasteners 33 are machine screws.

The second locking portion 32 defines at least one second through hole 321. The second locking portion 32 is locked to the base 1 by a locking member (not shown) passing through the second through hole 321. The second through hole 321 is a stepped hole. The first locking portion 31 of the locking block 30 locks the limiting block 20 in position, and the second locking portion 32 of the locking block 30 fixes the locking block 30 to the base 1.

When the limiting block 20 is fixed on the base 1, the fixing members 40 are received through the first through holes 202 and fixed on the base 1. The positioning posts 50 are received through the third through holes 203. The locking blocks 30 are in the first position, and the fasteners 33 abut against the limiting block 20 to lock the limiting block 20 in position. The positioning posts 50 position the limiting block 20 in the initial position. The center of the lens of the product is placed on the fixing portion 204.

In one embodiment, the test fixture 100 is coupled to a detecting device (not shown). When the detecting device detects that the center of the lens of the product placed on the fixing portion 204 is not aligned, the test fixture 100 needs to adjust the position of the lens. At this time, when the locking blocks 30 are moved from the first position to the second position, the fasteners 33 are removed from the sides of the limiting block 20, the positioning posts 50 are removed from the third through holes 203, the fixing members 40 are loosened, and the limiting block 20 is rotated to adjust the center of the lens. Then, the locking blocks 30 are moved from the second position to the first position to abut the fasteners 33 against the limiting block 20 to lock the limiting block 20, and the fixing members 40 are tightened to the base 1 to fix the limiting block 20 to the base 1.

Referring to FIG. 4, the base 1 further includes at least one adjustment block 15 and a circuit board 16. The circuit board 16 is disposed on a bottom side of the base 1. Specifically, the test fixture 100 includes two adjustment blocks 15 detachably disposed on the base 1. One end of a first adjustment block 15 abuts against the limiting block 20 to prevent large displacement of the limiting block 20. A second adjustment block 15 is disposed substantially perpendicularly to the first adjustment block 15 to abut against the first adjustment block 15. The two adjustment blocks 15 make the limiting block 20 more stably disposed on the base 1. Further, when a shape of the limiting block 20 needs to be changed for fixing other products, a shape of the adjustment blocks 15 is correspondingly adjusted to be able to abut against the limiting block 20 without the test fixture 100 needing to be replaced. The adjustment blocks 15 fix the circuit board 16 to the bottom side of the base 1. It can be understood that the adjustment blocks 15 can be fixed on the base 1 by screws, vacuum adsorption, positioning posts, or other means.

The test fixture 100 uses the adjustable structure 2 to finely adjust the product to align the product with the detecting mechanism. The locking blocks 30 are switched between the first position and the second position, and the fixing members 40 and the positioning posts 50 are fixed or loosened so that the limiting block 20 is fixed to the base 1 or rotated on the base 1 to finely adjust the center of the lens of the product. Furthermore, after adjustment is performed, the limiting block 20 is not displaced.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A test fixture for adjusting a position of a product, the test fixture comprising:
    a base; and
    an adjustable structure comprising a limiting block, at least one locking block, and at least one fixing member, wherein
    the limiting block is disposed on the base;
    the at least one locking block is disposed on the base and abuts an edge of the limiting block to lock the limiting block in position;
    the at least one fixing member is disposed on the limiting block to fix the limiting block on the base;
    when the at least one locking block is moved from a first position to a second position, the locking block unlocks the limiting block, the at least one fixing member is loosened, and the limiting block is rotatable on the base; and
    after the limiting block is rotated, the at least one locking block is moved from the second position to the first position to lock the limiting block, and the at least one fixing member is tightened to fix the limiting block on the base.

2. The test fixture of claim 1, wherein:
    one end of the limiting block forms a curved sidewall.

3. The test fixture of claim 2, wherein:
the limiting block defines at least one first through hole corresponding to the at least one fixing member;
an opening of the at least one first through hole has a predetermined length;
when the limiting block is rotated on the base, a position of the at least one fixing member in the at least one first through hole changes.

4. The test fixture of claim 3, wherein:
each of the at least one locking block comprises a fastener, and the fastener is located on a side of a corresponding one of the at least one locking block facing the limiting block;
when the at least one locking block locks the limiting block in position, the fastener abuts against the limiting block;
when the at least one locking block unlocks the limiting block, the fastener is removed from the limiting block.

5. The test fixture of claim 4, wherein:
each of the at least one locking block further comprises a first locking portion and a second locking portion;
the first locking portion is coupled to and perpendicular to the second locking portion;
the fastener is disposed on the first locking portion;
the first locking portion locks the limiting block in position, and the second locking portion is fixed to the base.

6. The test fixture of claim 1, wherein:
the limiting block defines a third through hole;
the test fixture comprises a positioning post received in the third through hole to position the limiting block in an initial position;
the positioning post is removed from the third through hole to adjust the limiting block.

7. The test fixture of claim 1, wherein:
the limiting block comprises a fixing portion for fixing a product for testing.

8. The test fixture of claim 1, further comprising an adjustment block, wherein:
the adjustment block abuts against a side of the limiting block.

* * * * *